United States Patent
Mookerjee et al.

(10) Patent No.: US 10,295,973 B1
(45) Date of Patent: May 21, 2019

(54) SYSTEM AND METHOD FOR CONTROL AND GUIDANCE OF AN OBJECT

(71) Applicant: Lockheed Martin Corporation, Bethesda, MD (US)

(72) Inventors: Purusottam Mookerjee, Bridgewater, NJ (US); Benjamin C. Montone, Moorestown, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 316 days.

(21) Appl. No.: 15/208,110

(22) Filed: Jul. 12, 2016

(51) Int. Cl.
*G05B 15/00* (2006.01)
*G05B 15/02* (2006.01)
*G05D 13/00* (2006.01)
*G05D 13/62* (2006.01)

(52) U.S. Cl.
CPC ........... *G05B 15/02* (2013.01); *G05D 13/62* (2013.01)

(58) Field of Classification Search
CPC ........ G05B 15/00; G05B 15/02; G05D 13/00; G05D 13/62; G05D 1/00; G05D 1/12; F41G 7/00; F41G 7/22; F41G 7/30; F41G 7/34; F41G 9/00; G06F 17/00; G06F 17/10
See application file for complete search history.

(56) References Cited

U.S. PATENT DOCUMENTS 5,435,503 A 7/1995 Johnson, Jr. et al.
6,651,004 B1 * 11/2003 Perruzzi ............... F41G 9/008
114/21.1
8,063,347 B1 * 11/2011 Urbano ............... F41G 7/007
244/3.1
8,436,283 B1 * 5/2013 Tournes ............... F41G 7/22
244/3.1
9,212,870 B2 * 12/2015 Gate ...................... G05D 1/12

OTHER PUBLICATIONS

Bryson, A. and Ho, Y.; "Applied Optimal Control: Optimization, Estimation, and Control." Hemisphere Publishing Corporation, Washington, DC, 1975, pp. 154-155, 287-289.
Kirk, D.E.; "Optimal Control Theory: An Introduction." Prentice-Hall Inc., Englewood Cliffs, NJ, 1970, pp. 219-227.
Tewari, A.; "Advanced Control of Aircraft, Spacecraft, and Rockets." John Wiley & Sons, Ltd., 2011, pp. 45. 53.

* cited by examiner

*Primary Examiner* — Yonel Beaulieu
(74) *Attorney, Agent, or Firm* — Howard IP Law Group

(57) ABSTRACT

A guidance system configured for providing control information to a guided object moving the guided object from an initial state to a target final state within a finite time interval. A controller receives information of the desired state and information representative of the guided object's current state including position and velocity. The controller includes a processor configured to calculate a control solution based on four variables relating to the present state, and the target state, wherein the processor is configured to apply coefficient weights to each of the four state variables and wherein a common coefficient weight is applied to the current state of position and the target state of position, and different coefficient weights are applied to each of the current state and target state of velocity.

13 Claims, 4 Drawing Sheets

SYSTEM AND METHOD FOR CONTROL AND GUIDANCE OF AN OBJECT

STATEMENT OF GOVERNMENTAL INTEREST

This invention was made with government support under Contract No. HQ0276-10-C-0001 awarded by the Department of Defense Missile Defense Agency. The government has certain rights in the invention.

FIELD OF THE INVENTION

This application relates to control systems.

BACKGROUND OF THE INVENTION

Control and guidance systems operate to direct an object from a given state to a desired (or target) state. Existing control systems often employ control solutions that rely on an object's current state (e.g. position and velocity) as well as an object's target state (e.g. a target destination and a target or desired velocity) to generate one or more control parameters or outputs used to direct the object to optimally reach the target state given the current state. Current control solutions, however, exhibit various drawbacks including inaccuracies in effectively reaching the target location, and/or inefficient computational resource and computer functions due to their high computational demands.

Alternative systems and methods for guiding objects to a target state are desired.

SUMMARY

Embodiments of the disclosure find application in control and guidance systems, including by way of non-limiting example, automotive control and manufacturing, robotic sensing and control, ballistic missile defense, and other computer implemented technologies that require mobile object guidance and tracking solutions. In one embodiment of the present disclosure, a guidance system that generates control information for guiding an object from an initial state of position and velocity to a desired (e.g. final) state of position and velocity within a finite time interval is provided. The system includes a controller or control processor configured to receive information indicative of the desired state of position and velocity of the object and information indicative of the current state of position and velocity of the object, and a memory device in communication with the controller. The memory device stores program instructions, wherein the controller is operative with the program instructions to generate: 1) a first coefficient for weighting the current state of position and the target state of position parameters; 2) a second coefficient for weighting the current state of velocity parameter; and 3) a third coefficient for weighting the target state of velocity parameter. Using the weighted parameters of the current state of position, the current state of velocity, the target state of position and the target state of velocity, the control processor is operative to calculate control information indicative of an optimal motion of the object.

DETAILED DESCRIPTION

Figure 1:
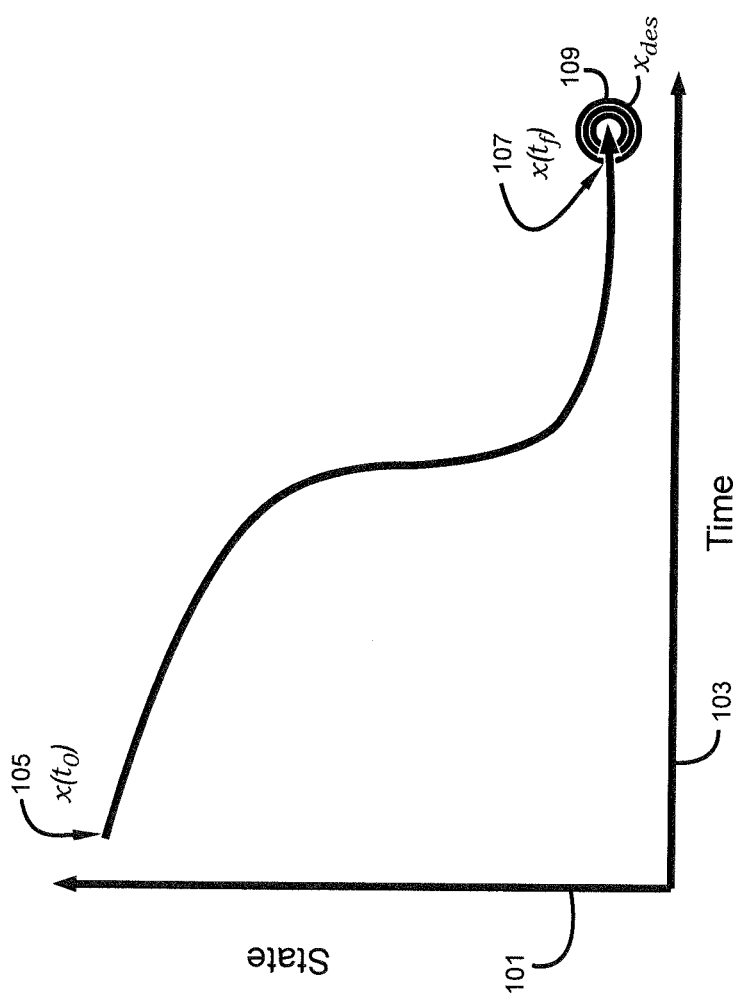
FIG. 1 is a graphical depiction of a control solution according to an embodiment of the disclosure.

It is to be understood that the figures and descriptions of the present invention have been simplified to illustrate elements that are relevant for a clear understanding of the present invention, while eliminating, for purposes of clarity, many other elements found in typical guidance and control systems. However, because such elements are well known in the art, and because they do not facilitate a better understanding of the present invention, a discussion of such elements is not provided herein. The disclosure herein is directed to all such variations and modifications known to those skilled in the art.

In the following detailed description, reference is made to the accompanying drawings that show, by way of illustration, specific embodiments in which the invention may be practiced. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout several views.

FIG. 1 is a simplified graphical depiction of a tracking problem useful for describing embodiments of the present disclosure. In the exemplary scenario, an object may travel from a certain state depicted by vertical axis 101 at a given time depicted by horizontal axis 103 to another state at a different time. The object begins at an initial state $x(t_0)$ and time $(t_0)$ 105 and arrives at a final state $x(t_f)$ at a final time $(t_f)$ 107. Thus the object travels within a finite time period defined by $t_f$-$t_0$. Final state $x(t_f)$ 107 may coincide with a target or desired state $x_{des}$ 109.

A control scheme according to an embodiment of the present disclosure is configured designed to generate control information, for example, in the form of one or more control signals or commands indicative of a desired acceleration. This control parameter u(t) may be periodically generated at one or more intermediate times between $t_0$ and $t_f$ to a control system or processor for controlling the motion of the object from the initial state 105 to the final state 107.

Figure 2:
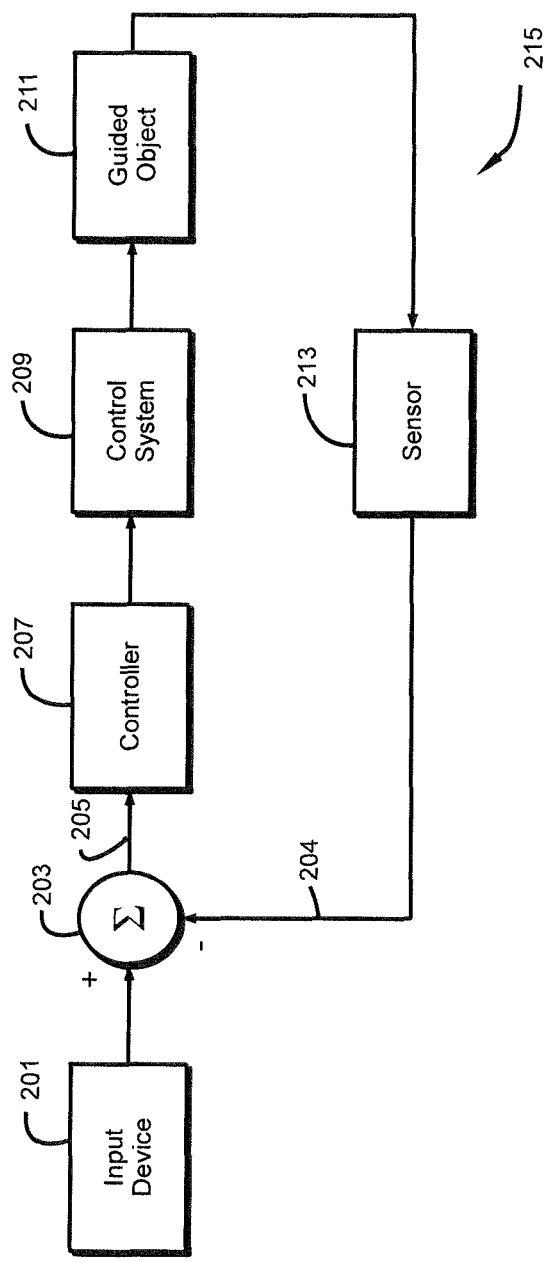
FIG. 2 is a simplified diagram of a control system according to embodiments of the present disclosure

More specifically, referring generally to FIG. 2, a simplified diagram of an exemplary guidance or control system for guiding an object 211 in three dimensional space from an initial state to a final desired state as shown in FIG. 1 is provided. The system includes at least one processor, embodied herein as controller or control processor 207 configured to generate control information (e.g. a control command indicative of a desired motion of object 211). An input device (e.g. a keyboard) 201 is provided for receiving state information (e.g. from a user) indicative of a desired terminal or final state (e.g. a desired position and/or velocity at a final time $t_f$).

The system further includes one or more sensors 213 configured to measure state conditions of the guided object 211. For example, sensors 213 may detect at least one of the position and/or the velocity of object 211. Other object state conditions may be detected, for example, acceleration, orientation (e.g. inclination and attitude) and the like. Information representative of the state conditions detected by sensor(s) 213 may be processed into information carrying state signals 204. State signals 204 and the information relating to the target terminal state are provided to a comparator 203 for generating an indication 205 of the difference between the desired final object state and the current object state as measured by sensor 213, and providing this indication to controller 207.

As will be set forth in greater detail herein, controller 207 is responsive to the desired final state parameters (e.g. desired velocity and position), current or measured stage parameters (e.g. current velocity and position), a desired final time, and the difference between the desired final state parameters and the current state parameters for generating an optimized control command signal or control information indicative of a desired motion to be imparted on the object. More specifically, this control information or control parameter is indicative of a desired motion of the object for guiding the object to the desired final position at the desired final velocity in the desired time given its current state. The output of controller 207 is provided to, for example, a control system 209. Control system 209 may include components (e.g. actuators, engines, and the like) for guiding object 211. The input provided to control system 209 is operative to adjust operating parameters (e.g. acceleration) of guided object 211 and/or to adjust the course of the guided object 211 based on the state signals 204 derived from its current state, and the information relating to the desired terminal state 201. In this way, the detection of the current state conditions of the guided object 211 by sensors 213 and the provision of state signals 204 to controller 207, define a feedback loop 215.

Figure 3:
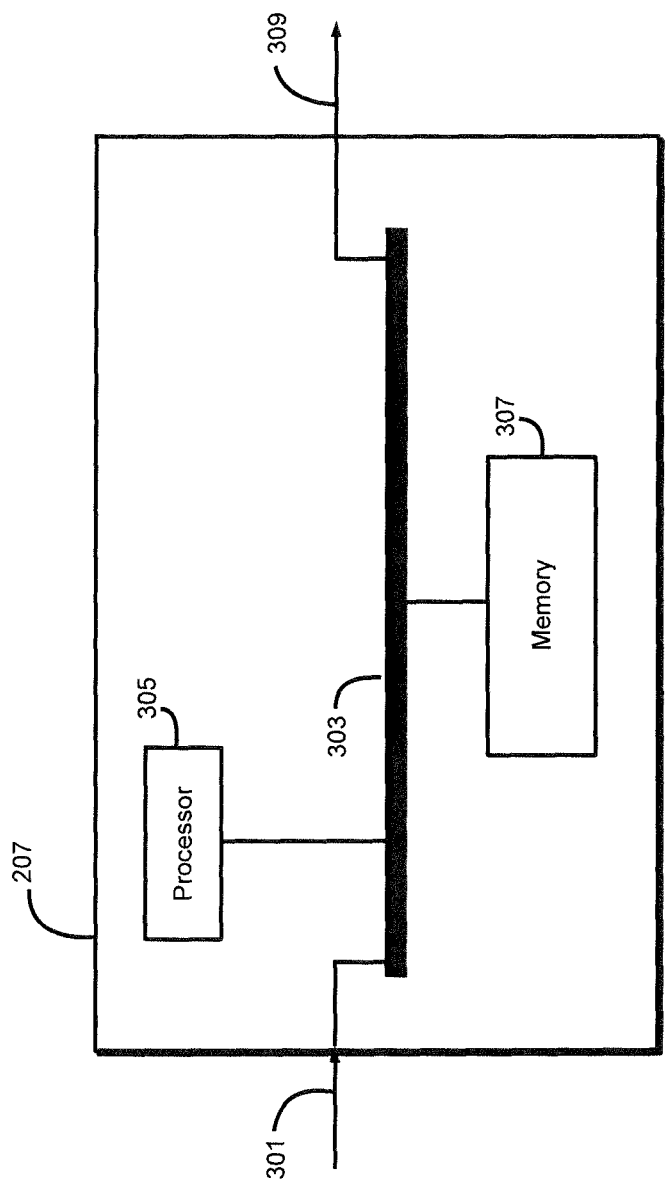
FIG. 3 is simplified system diagram of a controller or control processor according to an embodiment of the disclosure.

Referring now to FIG. 3, a simplified diagram of exemplary controller 207 of FIG. 2 is shown. Controller 207 includes an input 301 for receiving state information. Input 301 may be configured to receive information relating to a desired state (e.g. position and velocity) for a guided object at a desired destination and a final time of a finite time interval. Further input 301 may be configured to receive feedback information relating to present state conditions of the guided object, such as information relating to the position and velocity information of the guided object at some intermediate time during the finite time interval. As set forth above, information relating to the present or current state of the guided object may be detected and provided by one or more sensors in communication with the guided object for producing state signals representative of the state information. Input 301 is in communication with a communications bus 303. A control processor 305 and memory 307 are in communication with communications bus 303. Memory 307 may be a non-transitory memory which stores instruction, which when executed by control processor 305 cause the processor to perform various operations including the generation of a control solution which assist in guiding the guided object to the desired destination state. Memory 307 may also store time invariant information such as matrices discussed herein for generating an optimal control solution. Control processor 305 may be any suitable processor for receiving state information inputs and software instructions for generating a control solution to the control system of the guided object.

Control processor 305 is configured to generate control information or a control command indicative of an optimum motion (e.g. an acceleration) to be imparted on the object. More specifically, control processor 305 according to embodiments of the present disclosure is configured to generate control information or an optimized control parameter $u_{opt}(t)$ defined by the following control solution:

$$u_{opt}(t) = \qquad\qquad\qquad\qquad\qquad\qquad\text{Equation (1)}$$

$$-\frac{\frac{1}{c_v}(t_f - t) + \frac{(t_f - t)^2}{2}}{\frac{1}{c_p c_v} + \frac{1}{c_v}\frac{(t_f - t)^3}{3} + \frac{1}{c_p}(t_f - t) + \frac{(t_f - t)^4}{12}} x_{opt}^{(p)}(t) -$$

$$\frac{\frac{1}{c_p} + \frac{1}{c_v}(t_f - t)^2 + \frac{(t_f - t)^3}{3}}{\frac{1}{c_p c_v} + \frac{1}{c_v}\frac{(t_f - t)^3}{3} + \frac{1}{c_p}(t_f - t) + \frac{(t_f - t)^4}{12}} x_{opt}^{(v)}(t) +$$

$$\frac{\frac{1}{c_v}(t_f - t)^2 + \frac{(t_f - t)^2}{2}}{\frac{1}{c_p c_v} + \frac{1}{c_v}\frac{(t_f - t)^3}{3} + \frac{1}{c_p}(t_f - t) + \frac{(t_f - t)^4}{12}} r_p(t_f) +$$

$$\frac{\frac{1}{c_p} - \frac{(t_f - t)^3}{6}}{\frac{1}{c_p c_v} + \frac{1}{c_v}\frac{(t_f - t)^3}{3} + \frac{1}{c_p}(t_f - t) + \frac{(t_f - t)^4}{12}} r_v(t_f)$$

wherein $t_f$ is the desired final time, t is the current time, $x_{opt}^{(p)}(t)$ is the current position, $x_{opt}^{(v)}(t)$ is the current velocity, $r_p(t_f)$ is the desired final position, $r_v(t_f)$ is the desired final velocity, $c_p$ is a first predetermined weight, which dictates the contribution or effect of a difference between a desired final position and an actual or current position, and $c_v$ is a second predetermined weight, which dictates the contribution or effect of a difference between a desired final velocity and an actual or current velocity. The processor 305 solves a particular technical problem of guidance and control systems, providing an optimal control solution with higher accuracy for the guided object, while requiring less computations through the use of a closed form solution and time invariant input matrices.

Controller 305 may be configured to generate weights $c_p$ and $c_v$. Controller 305 is further operative to generate or calculate the coefficients associated with each state parameter $x_{opt}^{(p)}(t)$, $x_{opt}^{(v)}(t)$, $r_p(t_f)$ and $r_v(t_f)$. As shown above, the current position state $x_{opt}^{(p)}(t)$ and the final desired position state $r_p(t_f)$ share the same coefficient, while the current velocity state $x_{opt}^{(v)}(t)$ and the desired final velocity state $r_v(t_f)$ are weighted (i.e. multiplied by) by their own distinct coefficient.

Figure 4:
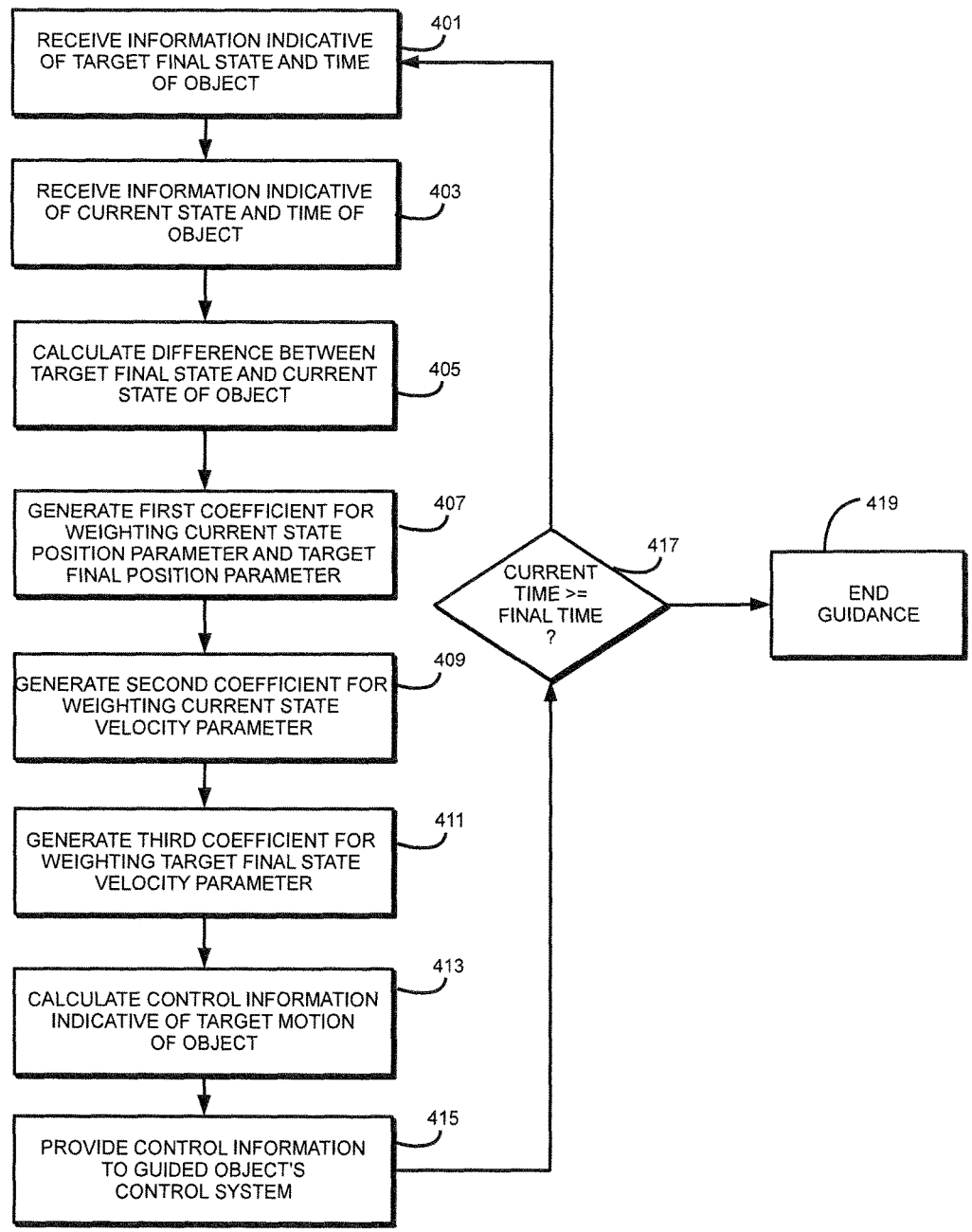
FIG. 4 is a simplified process flow diagram illustrating a method of generating control information according to an embodiment of the present disclosure.

FIG. 4 is a process flow diagram showing a method of calculating control information for a control system of a guided object according to an embodiment of this disclosure. In a processor of a controller, the processor receives information indicative of a target final state and time of the guided object 401. The processor further receives information indicative of the current state (e.g. position and velocity) and time of the guided object 403. The current state may be determined by one or more sensors in communication with the guided object. The detected states are processed into state signals which are provided to the processor. A difference between the target final state information and current object state is determined with regard to position and velocity 405. A first coefficient is calculated and applied to the current state position parameter and the target final state position parameter 407. A second coefficient is calculated and applied to the current state velocity parameter 409. A third coefficient is calculated and applied to the target final state velocity parameter 411. Using the first, second and third coefficients, the current state and target final state of position and velocity are weighted to calculate control information that is indicative of a target motion of the object to optimally direct the object toward its target state 413. The calculated control information is provided to the guided object's control system for adjusting the current state of the guided object 415. The method steps are repeated while the current time has not reached the final time 417. If the current time is equal to or later than the final time, the guidance procedure ends 419.

The following description includes a general summary of the problem as well as a detailed description of the derivation of the control solution (Eq. 1) according to an embodiment of the present disclosure set forth above.

By way of further background, consider a mobile object that must travel from a first point A to a second point B. Therefore, the target destination is point B. A comparator calculates an error at some point in time to produce a control solution for input to the object's control system for guiding the object to the desired destination (e.g. Point B). Thus, the error is input to a guidance control algorithm and generates an output as a calculated control solution or signal. The control solution or signal is input to an actuator (control system), which executes an action based on the control signal. The result of the action is to move the guided object towards its target destination, point B. This guidance typically doesn't occur instantaneously. A sensor in the system observes the guided object along the object's path and feeds back information about the object's current state (e.g. position and velocity) to the comparator. This feedback closes the control loop. The action of generating the control solution or signal continues at predetermined time intervals until the object reaches the desired conditions or state (e.g. position at point B at a desired velocity).

With regard to control and guidance, objects may be required to move from one point in space to another point in space (e.g. in three dimensions). Numerous considerations exist for executing such a motion in an optimal manner. For example, techniques may consider (1) a minimum energy, (2) a minimum deviation from a nominal path, wherein a path may be defined by a set of state variables including position and velocity, (3) a minimum deviation from the end state, and/or (4) a minimum time. In addition, other factors that may also be considered.

Two classes of control problems may be characterized as; (1) the regulator problem within a finite time horizon and (2) the tracking problem within a finite time horizon. In the regulator problem, the objective is to design a policy or control solution to produce states at each intermediate time (e.g. path following) during the finite time horizon including the end time to have a minimum deviation from an established zero nominal value. This is relevant to applications such as minimizing discomfort in the passenger cabin of an automobile in motion despite disturbances from exogenous inputs, according to one non-limiting example. In the tracking problem, the objective is to design a policy or control solution such that the state at every intermediate time during the finite time horizon including the end time has a minimum deviation from an established nonzero nominal value. This applies to applications such as path following of an autonomous vehicle while in motion in order to reach an end state, despite disturbances from exogenous inputs. These are typically referred to as linear quadratic regulator and tracking problems, respectively.

The present disclosure defines a tracking problem where the state vectors at intermediate times and at a final time are expected to be close to the target nominal values for elements of the state vector, (e.g., position and velocity components). This is referred to as a general linear tracking problem with path following (during the intermediate times) and reaching a desired terminal state at the final time. Another tracking problem is defined where the state vector only at the final time is expected to reach a desired state for certain elements of the state vector, (e.g., position and velocity components). This is called a linear tracking problem with no requirement for obtaining, or consideration of, intermediate object states (i.e. no path following) and is only concerned with reaching a desired terminal state at the final time.

It should be understood that the regulator problem is an instance of the general tracking algorithm having zero nominal values at the intermediate times and at the final time. Furthermore, the tracking problem having only a desired destination is a general tracking algorithm with no track or path following. For these reasons, a linear tracking problem with track or path following (a requirement for obtaining, or consideration of, object state at selected points in time during the intermediate time) and additionally reaching a desired terminal state at the final time is also a general formulation.

Typically, such a problem entails the formulation of coupled differential equations whose solution presents challenges because some variables are defined at initial time ($t_0$) and others are defined at the final time ($t_f$). Often in such cases, a closed form solution is not available. In some prior techniques, these two classes of tracking problems are addressed by formulating a simple model in three dimensions for the kinematic motion of a point mass involving position and velocity as states, and considering acceleration as an input. A quadratic penalty function is constructed based on the states and the input. The difference between the states (e.g. position and velocity) and the desired states at each intermediate time in addition to the final time are weighted by a positive definite matrix. The term representing the differences and a weight measure of a control action, thereby define a penalty function for a general tracking algorithm. The theory behind this solution involves two steps.

First, a Hamiltonian function is constructed using Lagrange multipliers (i.e., co-states), the performance index, and the dynamical state equations. This function leads to the formulation of coupled nonlinear differential equations involving state and co-state equations. This system has two times the dimension of the original state equation arising from the dynamics of the state equation and the co-state equations. Defining the state transition matrix for the dynamic matrix corresponding to this higher order nonlinear differential equation, an algebraic expression is obtained for the optimal Lagrange multipliers and the optimal control law in terms of the components of the state transition matrix and the optimal states at the concurrent time.

Second, these expressions are utilized to define two differential equations for the control matrix, K (symmetric in structure) and vector, s. The matrix K appears like a gain and the vector, s appears like an offset. However, these differential equations have their boundary conditions defined at the final time. Thus, this prior art solution produces a particular technical problem because some variables are defined at initial time and others are defined at the final time with no closed form solution.

Embodiments of the present disclosure provide a closed form control solution overcoming the drawbacks of the prior art. Consider an object with three position states $p_E(t)$, $p_N(t)$, $p_U(t)$, and three velocity states $v_E(t)$, $v_N(t)$, $v_U(t)$, driven by three inputs $u_E(t)$, $u_N(t)$, $u_U(t)$. These variables evolve in time according to:

$$\frac{d}{dt}\begin{bmatrix} p_E(t) \\ p_N(t) \\ p_U(t) \\ v_E(t) \\ v_N(t) \\ v_U(t) \end{bmatrix} = \begin{bmatrix} v_E(t) \\ v_N(t) \\ v_U(t) \\ u_E(t) \\ u_N(t) \\ u_{U(t)} \end{bmatrix} \quad \text{Equation (2)}$$

In matrix notation this is expressed as:

$$\frac{d}{dt}\begin{bmatrix} p_E(t) \\ p_N(t) \\ p_U(t) \\ v_E(t) \\ v_N(t) \\ v_{U(t)} \end{bmatrix} = \begin{bmatrix} 0 & 0 & 0 & 1 & 0 & 0 \\ 0 & 0 & 0 & 0 & 1 & 0 \\ 0 & 0 & 0 & 0 & 0 & 1 \\ 0 & 0 & 0 & 0 & 0 & 0 \\ 0 & 0 & 0 & 0 & 0 & 0 \\ 0 & 0 & 0 & 0 & 0 & 0 \end{bmatrix}\begin{bmatrix} p_E(t) \\ p_N(t) \\ p_U(t) \\ v_E(t) \\ v_N(t) \\ v_{U(t)} \end{bmatrix} + \quad \text{Equation (3)}$$

$$\begin{bmatrix} 0 & 0 & 0 \\ 0 & 0 & 0 \\ 0 & 0 & 0 \\ 1 & 0 & 0 \\ 0 & 1 & 0 \\ 0 & 0 & 1 \end{bmatrix}\begin{bmatrix} v_E(t) \\ v_N(t) \\ v_U(t) \\ u_E(t) \\ u_N(t) \\ u_{U(t)} \end{bmatrix}$$

Defining a state vector x(t):

$$x(t) \stackrel{def}{=} \begin{bmatrix} x^{(p)} \\ x^{(v)} \end{bmatrix} \stackrel{def}{=} \begin{bmatrix} p_E(t) \\ p_N(t) \\ p_U(t) \\ v_E(t) \\ v_N(t) \\ v_U(t) \end{bmatrix} \quad \text{Equation (4)}$$

Equation (4) is:

$$\dot{x}(t) = Ax(t) + Bu(t) \quad \text{Equation (5)}$$

where $$A \stackrel{def}{=} \begin{bmatrix} 0_{3\times 3} & I_{3\times 3} \\ 0_{3\times 3} & 0_{3\times 3} \end{bmatrix} \quad \text{Equation (6)}$$

and:

$$B \stackrel{def}{=} \begin{bmatrix} 0_{3\times 3} \\ I_{3\times 3} \end{bmatrix} \quad \text{Equation (7)}$$

Assuming the object is subjected to the control action u(t) at time $t_0$, at the end of the control action (i.e., time $t_f$), the objective is that the state vector $x(t_f)$ (e.g., position and velocity states) of the object be as close as possible to the target state $r(t_f)$ within some nominal tolerance. The control action is weighted by a positive definite matrix R and the terminal state deviation $[x(t_f)-r(t_f)]$ is weighted by a positive semi-definite matrix H. The control solution is obtained by minimizing a penalty function J, where:

$$J = \frac{1}{2}[x(t_f) - r(t_f)]^T H[x(t_f) - r(t_f)] + \frac{1}{2}\int_{t_0}^{t_f} u(t)^T Ru(t)dt \quad \text{Equation (8)}$$

where $$r(t_f) = [r_p(t_f) r_v(t_f)]^T \quad \text{Equation (9)}$$

and, $$H = \begin{bmatrix} c_p & 0 \\ 0 & c_v \end{bmatrix} \quad \text{Equation (10)}$$

These weights $c_p$ and $c_v$, penalize the difference between the actual position state variable $x_{opt}^{(p)}(t)$ variable $x_{opt}^{(v)}(t)$ and the target position $r_p(t_f)$ and velocity $r_v(t_f)$ respectively in a weighted square manner. These variables can be positive or zero, that is $c_p \geq 0$ and $c_v \geq 0$.

In view of the above, the process of developing a control solution for reaching a desired destination state may be defined in eight steps.

Step 1

A Hamiltonian using state equations, Lagrange multipliers and the penalty function, J is constructed. The objective is to minimize a function for a dynamical system. This function is $$\frac{1}{2}u(t)^T Ru(t)$$

and the dynamical system is as defined in Equation (4). These two effects are combined in what is called the Hamiltonian, $\mathcal{H}$, constructed according to:

$$\mathcal{H} = \frac{1}{2}u(t)^T Ru(t) + \lambda^T[Ax(t) + Bu(t)] \quad \text{Equation (11)}$$

Step 2

Formulate a control solution. To minimize Equation (11) with respect to a control action u(t), the derivative is taken and set equal to 0 (zero).

$$\frac{\partial}{\partial u}\mathcal{H} = Ru(t) + B^T\lambda(t) = 0 \quad \text{Equation (12)}$$

this leads to the optimal control solution:

$$u_{opt}(t) = -R^{-1}B^T \lambda_{opt}(t) \quad \text{Equation (13)}$$

Step 3

Derive a co-state equation. To arrive at the optimal solution, the Lagrange multiplier λ needs to satisfy another dynamical equation (e.g. a co-state). The co-state equation (involving the Lagrange multipliers) is defined by:

$$\dot{\lambda}_{opt}(t) = -\frac{\partial}{\partial x}\mathcal{H} = -A^T \lambda_{opt}(t) \quad \text{Equation (14)}$$

with $$\lambda_{opt}(t_f) = H[x_{opt}(t_f) - r(t_f)] \quad \text{Equation (15)}$$

Step 4

Construct a two-point boundary value problem (2PBVP). As of step 4, there are two dynamical equations defined, Equation (5) and Equation (14), which need to be solved simultaneously. Substituting the control action of Equation (13) into Equation (5) yields:

$$\dot{x}_{opt}(t) = Ax_{opt}(t) + Bu_{opt}(t) \quad \text{Equation (16)}$$

or $$\dot{x}_{opt}(t) = Ax_{opt}(t) - BR^{-1}B^T \lambda_{opt}(t) \quad \text{Equation (17)}$$

Together, Equation (14) and Equation (17) form:

$$\frac{d}{dt}\begin{bmatrix} x_{opt}(t) \\ \lambda_{opt}(t) \end{bmatrix} = \begin{bmatrix} A & -BR^{-1}B^T \\ 0_{3\times 3} & -A^T \end{bmatrix}\begin{bmatrix} x_{opt}(t) \\ \lambda_{opt}(t) \end{bmatrix} \quad \text{Equation (18)}$$

With the boundary condition of $x_{opt}(t)$ defined at time $t_0$ and the boundary condition of $\lambda_{opt}(t)$ defined at time $t_f$:

$$F \stackrel{def}{=} \begin{bmatrix} A & -BR^{-1}B^T \\ 0_{3\times 3} & -A^T \end{bmatrix} \quad \text{Equation (19)}$$

The solution is given by:

$$\begin{bmatrix} x_{opt}(t) \\ \lambda_{opt}(t) \end{bmatrix} = \Phi(t, t_1)\begin{bmatrix} x_{opt}(t_1) \\ \lambda_{opt}(t_1) \end{bmatrix} \quad \text{Equation (20)}$$

Choosing $t = t_f$ and $t_1 = t$ in Equation (20) becomes:

$$\begin{bmatrix} x_{opt}(t_f) \\ \lambda_{opt}(t_f) \end{bmatrix} = \begin{bmatrix} \phi_{11}(t_f, t) & \phi_{12}(t_f, t) \\ \phi_{12}(t_f, t) & \phi_{22}(t_f, t) \end{bmatrix}\begin{bmatrix} x_{opt}(t) \\ \lambda_{opt}(t) \end{bmatrix} \quad \text{Equation (21)}$$

Equation (21) then yields:

$$x_{opt}(t_f) = \phi_{11}(t_f, t)x_{opt}(t) + \phi_{12}(t_f, t)\lambda_{opt}(t) \quad \text{Equation (22)}$$

$$\lambda_{opt}(t_f) = \phi_{21}(t_f, t)x_{opt}(t) + \phi_{22}(t_f, t)\lambda_{opt}(t) \quad \text{Equation (23)}$$

where $\Phi(t, t_1) = e^{F(t-t_1)}$. The boundary conditions are specified as $x_{opt}(t_0) = x_0$ and:

$$\lambda_{opt}(t_f) = \frac{\partial}{\partial x(t_f)}\left\{\frac{1}{2}[x(t_f) - r(t_f)]^T H[x(t_f) - r(t_f)]\right\} = H[x_{opt}(t_f) - r(t_f)] \quad \text{Equation (24)}$$

The foregoing constitutes the two-point boundary value problem. Substituting Equation (22) in to Equation (24) results in:

$$\lambda_{opt}(t_f) = H[\phi_{11}(t_f,t)x_{opt}(t) + \phi_{12}(t_f,t)\lambda_{opt}(t) - r(t_f)] \quad \text{Equation (25)}$$

which when equated to Equation (23) equals:

$$\phi_{21}(t_f,t)x_{opt}(t) + \phi_{22}(t_f,t)\lambda_{opt}(t) = H[\phi_{11}(t_f,t)x_{opt}(t) + \phi_{12}(t_f,t)\lambda_{opt}(t) - r(t_f)] \quad \text{Equation (26)}$$

Collecting common terms for $x_{opt}(t)$ and $\lambda_{opt}(t)$ yields:

$$[\phi_{22}(t_f,t) - H\phi_{12}(t_f,t)]\lambda_{opt}(t) = [H\phi_{11}(t_f,t) - \phi_{21}(t_f,t)]x_{opt}(t) - Hr(t_f) \quad \text{Equation (27)}$$

Pre-multiplying by the inverse of $[\phi_{22}(t_f, t) - H\phi_{12}(t_f, t)]$ yields a solution for $\lambda_{opt}(t)$ as:

$$\lambda_{opt}(t) = [\phi_{22}(t_f,t) - H\phi_{12}(t_f,t)]^{-1}[H\phi_{11}(t_f,t) - \phi_{21}(t_f,t)]x_{opt}(t) - [\phi_{22}(t_f,t) - H\phi_{12}(t_f,t)]^{-1}[Hr(t_f)] \quad \text{Equation (28)}$$

which is of the form:

$$\lambda_{opt}(t) \stackrel{def}{=} K(t)x_{opt}(t) + s(t) \quad \text{Equation (29)}$$

where $$K(t) = [\phi_{22}(t_f,t) - H\phi_{12}(t_f,t)]^{-1}[H\phi_{11}(t_f,t) - \phi_{21}(t_f,t)], \text{ and} \quad \text{Equation (30)}$$

$$s(t) = -[\phi_{22}(t_f,t) - H\phi_{12}(t_f,t)]^{-1}[Hr(t_f)] \quad \text{Equation (31)}$$

Differentiating Equation (29) with respect to time yields:

$$\dot{\lambda}_{opt}(t) \stackrel{def}{=} \dot{K}(t)x_{opt}(t) + K(t)\dot{x}_{opt}(t) + \dot{s}(t) \quad \text{Equation (32)}$$

Equating Equation (14) and Equation (32) and substituting $\dot{x}_{opt}(t)$ gives:

$$-A^T(K(t)x_{opt}(t) + s(t)) = \dot{K}(t)x_{opt}(t) + K(t)(Ax_{opt}(t) + Bu_{opt}(t)) + \dot{s}(t) \quad \text{Equation (33)}$$

Substituting $u_{opt}(t)$ from Equation (13):

$$-A^T(K(t)x_{opt}(t) + s(t)) = \dot{K}(t)x_{opt}(t) + K(t)(Ax_{opt}(t) - BR^{-1}B^T\lambda_{opt}(t)) + \dot{s}(t) \quad \text{Equation (34)}$$

Substituting for $\lambda_{opt}(t)$:

$$-A^T(K(t)x_{opt}(t) + s(t)) = \dot{K}(t)x_{opt}(t) + K(t)(Ax_{opt}(t) - BR^{-1}B^T K(t)x_{opt}(t) - BR^{-1}B^T s(t)) + \dot{s}(t) \quad \text{Equation (35)}$$

Collecting Terms Yields:

$$[\dot{K}(t) + K(t)A + A^T K(t) - K(t)BR^{-1}B^T K(t)]x_{opt}(t) + [\dot{s}(t) + A^T S(t) - KBR^{-1}B^T S(t)] = 0 \quad \text{Equation (36)}$$

The following steps 5 through 8 provide the control solution using the calculations above described in steps 1 through 4.

Step 5

Solve nonlinear differential equation(s) with time independent matrices (e.g. boundary conditions set at final time, ($t_f$). Equation (36) needs a solution for K(t) for all state values at all times, $$[\dot{K}(t)+K(t)A+A^TK(t)-K(t)BR^{-1}B^TK(t)]=0 \quad \text{Equation (37)}$$

which is a nonlinear differential equation with time independent matrices A, B, with boundary conditions $K(t_f)=H$.

Step 6

Solve linear differential equation with time dependent matrices, dependent on the solution to step 5, $$[\dot{s}(t)+A^TS(t)-KBR^{-1}B^Ts(t)]=0 \quad \text{Equation (38)}$$

which is a linear differential equation with time independent matrices, A,B, and time dependent matrix, K.

Equation (30) may then be written as:

$$K(t)=\Psi_1^{-1}\Psi_2 \quad \text{Equation (39)}$$

and Equation (31) may be written as:

$$s(t)=\Psi_1^{-1}\Psi_3 \quad \text{Equation (40)}$$

where $$\Psi_1=[\phi_{22}(t_f,t)-H\phi_{12}(t_f,t)], \quad \text{Equation (41)}$$

$$\Psi_2=[H\phi_{11}(t_f,t)-\phi_{21}(t_f,t)], \quad \text{and Equation (42)}$$

$$\Psi_3=-[Hr(t_f)] \quad \text{Equation (43)}$$

It may be seen that Equation (30) and Equation (31) each share a common left inverse, $\Psi_1^{-1}$. Therefore, the control solution is:

$$u_{opt}(t) = -R^{-1} \quad \text{Equation (44)}$$

$$B^T[\phi_{22}(t_f,t)-H\phi_{12}(t_f,t)]^{-1}[H\phi_{11}(t_f,t)-\phi_{21}(t_f,t)]$$

$$x_{opt}(t) + R^{-1}B^T[\phi_{22}(t_f,t)-H\phi_{12}(t_f,t)]^{-1}[Hr(t_f)]$$

with matrices, B defined in Equation (6) and Equation (7), the matrix F, in Equation (19) is:

$$F = \begin{bmatrix} 0 & 1 & 0 & 0 \\ 0 & 0 & 0 & -1 \\ 0 & 0 & 0 & 0 \\ 0 & 0 & -1 & 0 \end{bmatrix} \quad \text{Equation (45)}$$

The matrix exponential $\Phi(t, t_1)$ can be computed using the Cayley-Hamilton theorem. The matrix F has four zero eigenvalues and hence the matrix exponential $\Phi(t, t_1)$ is computed by the first four terms of the exponential series. That is, $$e^{F(t_f-t)} = I + F(t_f-t) + \frac{F^2(t_f-t)^2}{2} + \frac{F^3(t_f-t)^3}{6} \quad \text{Equation (46)}$$

and the closed form solution is:

$$e^{F(t_f-t)} = \begin{bmatrix} 1 & (t_f-t) & \frac{(t_f-t)^3}{6} & -\frac{(t_f-t)^2}{2} \\ 0 & 1 & \frac{(t_f-t)^2}{2} & -(t_f-t) \\ 0 & 0 & 1 & 0 \\ 0 & 0 & -(t_f-t) & 1 \end{bmatrix} \quad \text{Equation (47)}$$

Equation (47) may be viewed as having four partitions according to:

$$e^{F(t_f-t)} \stackrel{def}{=} \begin{bmatrix} \phi_{11}(t_f,t) & \phi_{12}(t_f,t) \\ \phi_{21}(t_f,t) & \phi_{22}(t_f,t) \end{bmatrix} \quad \text{Equation (48)}$$

with:

$$\phi_{11}(t_f,t) \stackrel{def}{=} \begin{bmatrix} 1 & (t_f-t) \\ 0 & 1 \end{bmatrix}, \quad \text{Equation (49)}$$

$$\phi_{12}(t_f,t) \stackrel{def}{=} \begin{bmatrix} \frac{(t_f-t)^3}{6} & -\frac{(t_f-t)^2}{2} \\ \frac{(t_f-t)^2}{2} & -(t_f-t) \end{bmatrix}, \quad \text{Equation (50)}$$

$$\phi_{21}(t_f,t) \stackrel{def}{=} \begin{bmatrix} 0 & 0 \\ 0 & 0 \end{bmatrix}, \text{and} \quad \text{Equation (51)}$$

$$\phi_{22}(t_f,t) \stackrel{def}{=} \begin{bmatrix} 1 & 0 \\ -(t_f-t) & 1 \end{bmatrix} \quad \text{Equation (52)}$$

Formulating the matrices of Equation (30) and Equation (31) as consisting of partition matrices, $$K(t) \stackrel{def}{=} \begin{bmatrix} K_{11}(t) & K_{12}(t) \\ K_{12}(t) & K_{22}(t) \end{bmatrix} \quad \text{Equation (53)}$$

and $$s(t) \stackrel{def}{=} \begin{bmatrix} s_1 \\ s_2 \end{bmatrix} \quad \text{Equation (54)}$$

Step 7

Compute the control law or solution. As a result of the intermediate solutions above, the final control solution, $u_{opt}$ is:

$$u_{opt} = -R^{-1}B^T\begin{bmatrix} K_{11} & K_{12} \\ K_{12} & K_{22} \end{bmatrix}x_{opt}(t) - R^{-1}B^T\begin{bmatrix} s_1 \\ s_2 \end{bmatrix} \quad \text{Equation (55)}$$

which with reference to Equation (7), simplifies to:

$$u_{opt} = -[K_{12} \quad K_{22}]\begin{bmatrix} x_{opt}^{(p)} \\ x_{opt}^{(v)} \end{bmatrix} - s_2 \quad \text{Equation (56)}$$

The solution for the terms are:

$$K_{12}(t) = \frac{\frac{1}{c_v}(t_f-t) + \frac{(t_f-t)^2}{2}}{\frac{1}{c_p c_v} + \frac{1}{c_v}\frac{(t_f-t)^3}{3} + \frac{1}{c_p}(t_f-t) + \frac{(t_f-t)^4}{12}}$$

$$K_{22}(t) = \frac{\frac{1}{c_p} + \frac{1}{c_v}(t_f-t)^2 + \frac{(t_f-t)^3}{3}}{\frac{1}{c_p c_v} + \frac{1}{c_v}\frac{(t_f-t)^3}{3} + \frac{1}{c_p}(t_f-t) + \frac{(t_f-t)^4}{12}}$$

$$s_2(t) = \\ -\frac{\frac{1}{c_v}(t_f-t) + \frac{(t_f-t)^2}{2}}{\frac{1}{c_p c_v} + \frac{1}{c_v}\frac{(t_f-t)^3}{3} + \frac{1}{c_p}(t_f-t) + \frac{(t_f-t)^4}{12}} r_p(t_f) - \\ \frac{\frac{1}{c_p} - \frac{(t_f-t)^3}{6}}{\frac{1}{c_p c_v} + \frac{1}{c_v}\frac{(t_f-t)^3}{3} + \frac{1}{c_p}(t_f-t) + \frac{(t_f-t)^4}{12}} r_v(t_f)$$

Equation (57)

$$\frac{\frac{1}{c_p} + \frac{1}{c_v}(t_f-t)^2 + \frac{(t_f-t)^3}{3}}{\frac{1}{c_p c_v} + \frac{1}{c_v}\frac{(t_f-t)^3}{3} + \frac{1}{c_p}(t_f-t) + \frac{(t_f-t)^4}{12}} x_{opt}^{(v)}(t) +$$

Equation (58)

$$\frac{\frac{1}{c_v}(t_f-t) + \frac{(t_f-t)^2}{2}}{\frac{1}{c_p c_v} + \frac{1}{c_v}\frac{(t_f-t)^3}{3} + \frac{1}{c_p}(t_f-t) + \frac{(t_f-t)^4}{12}} r_p(t_f) +$$

Equation (59)

$$\frac{\frac{1}{c_p} - \frac{(t_f-t)^3}{6}}{\frac{1}{c_p c_v} + \frac{1}{c_v}\frac{(t_f-t)^3}{3} + \frac{1}{c_p}(t_f-t) + \frac{(t_f-t)^4}{12}} r_v(t_f)$$

Step 8

Propagate the state from initial conditions to final desired conditions (e.g. from boundary conditions set at initial time ($t_0$) based on the solutions of steps 5 through 7 above. To achieve the optimal trajectory, propagate $x(t)$ from $x(t_0)$ using the solutions of $K(t)$, $s(t)$, and $u_{opt}(t)$ to the final, desired conditions, $x(t_f)$. For the following final conditions:

| Cases | Description | Control Solution |
|---|---|---|
| $c_p \to 0$ | Terminal position not controlled | $u_{opt}(t) = -\dfrac{x_{opt}^{(v)}(t) - r_v(t_f)}{\frac{1}{c_v} + (t_f - t)}$ |
| $c_v \to 0$ | Terminal velocity not controlled | $u_{opt}(t) = -\dfrac{(t_f - t)[x_{opt}^{(p)}(t) - r_p(t_f)] - (t_f - t)^2 x_{opt}^{(v)}(t)}{\frac{1}{c_p} + \frac{(t_f-t)^3}{3}}$ |
| $c_p \to \infty$<br>$c_v \to 0$ | Terminal position tends to desired position<br>Terminal velocity not controlled<br>(Intercept) | $u_{opt}(t) = -\dfrac{3(x_{opt}^{(p)}(t) - r_p(t_f))}{(t_f - t)^2} - \dfrac{3 x_{opt}^{(v)}(t)}{t_f - t}$ |
| $c_p \to \infty$<br>$c_v \to \infty$ | Terminal position tends to desired position<br>Terminal velocity not controlled<br>(Rendezvous) | $u_{opt}(t) = -\dfrac{6[x_{opt}^{(p)}(t) - r_p(t_f)]}{(t_f - t)^2} - \dfrac{4 x_{opt}^{(v)}(t)}{t_f - t} - \dfrac{2 r_v(t_f)}{t_f - t}$ |
| $c_p > 0$ but finite<br>$c_v > 0$ but finite | Terminal position penalized<br>Terminal velocity penalized<br>(Most General Solution) | Equation (1) |

This yields the final control solution as:

Equation (1)

$$u_{opt}(t) = \\ -\frac{\frac{1}{c_v}(t_f-t) + \frac{(t_f-t)^2}{2}}{\frac{1}{c_p c_v} + \frac{1}{c_v}\frac{(t_f-t)^3}{3} + \frac{1}{c_p}(t_f-t) + \frac{(t_f-t)^4}{12}} x_{opt}^{(p)}(t) -$$

While the foregoing disclosure has been described with reference to the above-described embodiment, various modifications and changes can be made without departing from the spirit of the invention. Accordingly, all such modifications and changes are considered to be within the scope of the appended claims. Accordingly, the specification and the drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations of variations of various embodiments. Combinations of the above embodiments, and other embodiments not specifically described herein, will be apparent to those of skill in the art upon reviewing the above description.

What is claimed is:

1. A guidance system configured to generate control information for guiding an object from an initial state of position and velocity to a target final state of position and velocity within a finite time interval, comprising:
   a control processor configured to receive information indicative of the target final state of position and velocity of the object and information indicative of a current state of position and velocity of the object;
   a memory in communication with the control processor and storing program instructions, the controller processor operative with the program instructions to:
      generate a first coefficient for weighting the current state of position and the target final state of position parameters;
      generate a second coefficient for weighting the current state of velocity parameter;
      generate a third coefficient for weighting the target final state of velocity parameter;
      calculate control information indicative of an optimal motion of the object using the weighted parameters of the current state of position, the current state of velocity, the target final state of position and the target final state of velocity; and
      control, by a control system, motion of an object based upon the calculated control information to impart an optimal motion on the object in order to reach the target final state of position and the target final state of velocity.

2. The system of claim 1, wherein the control processor is further operative with the program instructions to:
   apply a first predetermined weight to a difference between the target final position of the object and the current position of the object; and
   apply a second predetermined weight to a difference between the target final velocity of the object and the current velocity of the object.

3. The system of claim 2, wherein the control processor is further operative with the program instructions to generate the first, second and third coefficients according to the first and second weights.

4. The system of claim 3, wherein the control information comprises a control parameter $u_{opt}(t)$, the control parameter defined by the relationship:

$$u_{opt}(t) = -\frac{\frac{1}{c_v}(t_f-t) + \frac{(t_f-t)^2}{2}}{\frac{1}{c_p c_v} + \frac{1}{c_v}\frac{(t_f-t)^3}{3} + \frac{1}{c_p}(t_f-t) + \frac{(t_f-t)^4}{12}} x_{opt}^{(p)}(t) -$$

$$\frac{\frac{1}{c_p} + \frac{1}{c_v}(t_f-t)^2 + \frac{(t_f-t)^3}{3}}{\frac{1}{c_p c_v} + \frac{1}{c_v}\frac{(t_f-t)^3}{3} + \frac{1}{c_p}(t_f-t) + \frac{(t_f-t)^4}{12}} x_{opt}^{(v)}(t) +$$

$$\frac{\frac{1}{c_v}(t_f-t) + \frac{(t_f-t)^2}{2}}{\frac{1}{c_p c_v} + \frac{1}{c_v}\frac{(t_f-t)^3}{3} + \frac{1}{c_p}(t_f-t) + \frac{(t_f-t)^4}{12}} r_p(t_f) +$$

$$\frac{\frac{1}{c_p} - \frac{(t_f-t)^3}{6}}{\frac{1}{c_p c_v} + \frac{1}{c_v}\frac{(t_f-t)^3}{3} + \frac{1}{c_p}(t_f-t) + \frac{(t_f-t)^4}{12}} r_v(t_f)$$

wherein $c_p$ is the first predetermined weight, $c_v$ is the second predetermined weight, $t_f$ is the target final time, t is the current time, $x_{opt}^{(p)}(t)$ is the current position, $x_{opt}^{(v)}(t)$ is the current velocity, $r_p(t_f)$ is the final target position, and $r_v(t_f)$ is the final target velocity.

5. The system of claim 1, further comprising at least one sensor for measuring the current position and velocity of the object.

6. The system of claim 5, further comprising a comparator responsive to an input indicative of the target final position and velocity of the object and to the output of the at least one sensor.

7. A method of guiding an object to a target final position and velocity at a target final time, the method comprising:
   receiving, by a control processor of a guidance system, information indicative of the target final position and velocity of the object;
   receiving information indication of the current state of position and velocity of the object;
   generating a first coefficient for weighting the current state of position and the desired final state of position parameters;
   generating a second coefficient for weighting the current state of velocity parameter;
   generating a third coefficient for weighting the target final state of velocity parameter; and
   calculating control information indicative of an optimal motion of the object using the weighted parameters of the current state of position, the current state of velocity, the target final state of position and the desired final state of velocity; and
   controlling, by a control system, motion of an object based upon the calculated control information to impart an optimal motion on the object in order to reach the target final state of position and the target final state of velocity.

8. The method of claim 7, further comprising the steps of:
   applying a first predetermined weight to a difference between the target final position of the object and the current position of the object; and applying a second predetermined weight to a difference between the target final velocity of the object and the current velocity of the object.

9. The method of claim 8, wherein the control information comprises a control parameter $u_{opt}(t)$, the control parameter defined by the relationship:

$$u_{opt}(t) = -\frac{\frac{1}{c_v}(t_f - t) + \frac{(t_f - t)^2}{2}}{\frac{1}{c_p c_v} + \frac{1}{c_v}\frac{(t_f - t)^3}{3} + \frac{1}{c_p}(t_f - t) + \frac{(t_f - t)^4}{12}} x_{opt}^{(p)}(t) -$$

$$\frac{\frac{1}{c_p} + \frac{1}{c_v}(t_f - t)^2 + \frac{(t_f - t)^3}{3}}{\frac{1}{c_p c_v} + \frac{1}{c_v}\frac{(t_f - t)^3}{3} + \frac{1}{c_p}(t_f - t) + \frac{(t_f - t)^4}{12}} x_{opt}^{(v)}(t) +$$

$$\frac{\frac{1}{c_v}(t_f - t) + \frac{(t_f - t)^2}{2}}{\frac{1}{c_p c_v} + \frac{1}{c_v}\frac{(t_f - t)^3}{3} + \frac{1}{c_p}(t_f - t) + \frac{(t_f - t)^4}{12}} r_p(t_f) +$$

$$\frac{\frac{1}{c_p} - \frac{(t_f - t)^3}{6}}{\frac{1}{c_p c_v} + \frac{1}{c_v}\frac{(t_f - t)^3}{3} + \frac{1}{c_p}(t_f - t) + \frac{(t_f - t)^4}{12}} r_v(t_f)$$

wherein $c_p$ is the first predetermined weight, $c_v$ is the second predetermined weight, $t_f$ is the final time, t is the current time, $x_{opt}^{(p)}(t)$ is the current position, $x_{opt}^{(v)}(t)$ is the current final velocity, $r_p(t_f)$ is the final target position, and $r_v(t_f)$ is the final target velocity.

10. A method of calculating a control solution for a guided object, comprising the steps of:

in a controller of a guidance system, calculating a control solution, the control solution being calculated based on four variables relating to the present state of position, the present state of velocity, the desired state of position, and the desired state of velocity, respectively, wherein the controller is configured to apply coefficient weights to each of the four variables and wherein a common coefficient weight is applied to the current state of position and the desired state of position, and different coefficient weights are applied to the current state of velocity and the desired state of velocity; and controlling, by a control system, motion of an object based upon the calculated control solution to impart motion on the object to reach the desired state of position and the desired state of velocity.

11. The system of claim 1, wherein the control system includes at least one of an actuator and an engine for controlling the motion of the object.

12. The method of claim 7, wherein controlling the motion of the object by the control system comprises controlling at least one of an actuator and an engine of the control system.

13. The method of claim 10, wherein controlling the motion of the object by the control system comprises controlling at least one of an actuator and an engine of the control system.

* * * * *